May 23, 1944.  H. W. GRAYBROOK ET AL  2,349,618
SELFREGULATED MOTOR-GENERATOR SET
Filed May 16, 1941
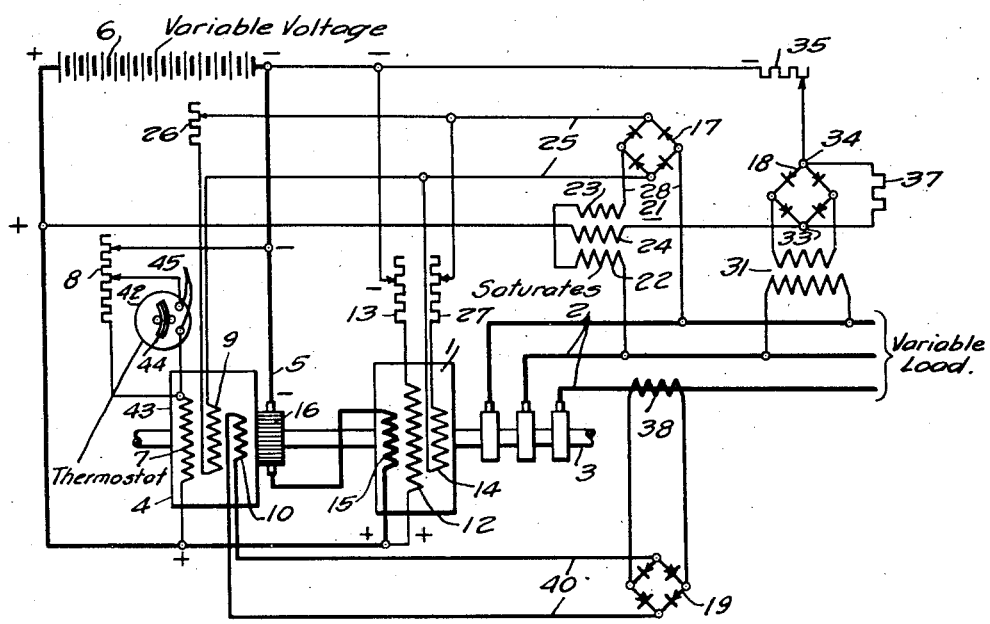
WITNESSES:
INVENTORS
Herbert W. Graybrook
and Chester J. Biscup.
BY
ATTORNEY Patented May 23, 1944

2,349,618

UNITED STATES PATENT OFFICE 2,349,618

SELF-REGULATED MOTOR-GENERATOR SET

Herbert W. Graybrook, Irwin, and Chester J. Biscup, Whitaker, Pa., assignors to Westinghouse Electric & Manufacturing Company, East Pittsburgh, Pa., a corporation of Pennsylvania Application May 16, 1941, Serial No. 393,742

14 Claims. (Cl. 171—119)

Our invention relates to self-regulating motor-generator sets, and particularly to a set consisting of a direct-current motor having a variable-voltage direct-current supply-source, and a variably loaded alternating-current generator driven from said motor, in combination with direct-current means for causing both the motor and the generator to be variably magnetically excited in such manner as to cause the speed of the motor, and hence the frequency of the generator, to be substantially constant throughout predetermined ranges of source-voltages and generator-loads, and in such manner as to cause the generator-voltage to be substantially constant under the same conditions, or to cause the generator to have any other predetermined voltage-characteristics.

An object of our invention is to utilize novel means in the excitation of either the motor or the generator of such a motor-generator set, or both the motor and the generator, said novel exciting-means comprising a rectifying means which is energized from an alternating-current output-voltage of the generator through a saturable reactor, the saturation of which is controlled in a manner which is responsive to some function of the variable voltage of the source, or to some function of the output-voltage of the generator, or to a differential function of both of these responses. Specifically, we prefer to utilize such a saturable-reactor-controlled exciting-voltage in combination with an exciting means which is responsive to the variable voltage of the direct-current source, the two responses being cumulative, in the case of the motor-excitation, and being differential in the case of the generator-excitation.

A further object of our invention is to cause the generator-excitation to be cumulatively modified in response to the armature-current of the motor, and to cause the motor-excitation to be differentially responsive to a rectified output-current of the generator, or more broadly, to cause the excitation of the motor or generator to be modified in accordance with a load-current of the motor-generator set.

A further object of our invention is to utilize thermostat-means, disposed in heat-exchanging relation to an exciting winding of at least one of the machines of the motor-generator set, for effecting a temperature-responsive regulating-action thereon, and more specifically for effecting a temperature-correcting adjustment to compensate for the increase in the resistance of the exciting winding when the machine reaches or approaches its steady-state operating-temperature under the load-conditions prevailing at the time.

With the foregoing and other objects in view, our invention consists in the combinations, systems, structures, parts and methods hereinafter described and claimed, and illustrated in the accompanying drawing, the single figure of which is a diagrammatic view of circuits and apparatus showing our invention, by way of illustration, in a preferred form of embodiment.

To illustrate the principles of our invention, without limiting ourselves, however, to the illustrated form of embodiment, we have shown our invention as being embodied in a motor-generator set for supplying alternating-current energy, at a substantially constant frequency and a substantially constant voltage, to a variable load such as a lighting-circuit for supplying 60-cycle fluorescent lamps (not shown). The motor-generator set comprises a 120-volt generator 1 which is illustrated as having a three-phase output-circuit 2, said generator being mounted on the same shaft 3 as a direct-current motor 4 having an armature circuit 5 which is energized from a storage battery 6, the voltage of which is subject to variation from, say, 26 volts to 45 volts, with the requirement that neither the frequency nor the voltage of the generator 1 shall vary materially throughout the above-mentioned variation in battery-voltage, or from minimum load to full load on the generator. It is also required that this regulation be accomplished without using any of the usual types of voltage-regulators or speed-regulators.

Both the motor and the generator are provided with exciting windings and various exciting-winding circuits for causing each machine to be variably excited in response to a plurality of different voltages or currents. As a means for obtaining these different exciting-winding responses, we have illustrated a separate exciting-winding section for each response, but we are not limited to this particular means for producing a resultant excitation which is the algebraic sum of several responses.

The motor 4 is illustrated as having a main shunt exciting-winding 7 which is connected between the positive terminal (+) and the negative terminal (—) of the battery 6, through an adjustable resistor 8. The motor 4 is also illustrated as having a cumulative auxiliary exciting winding 9 and a differential compounding exciting winding 10. The two last-mentioned exciting windings 9 and 10 are energized through special means which will be subsequently described.

The generator 1 is illustrated as being provided with a main exciting winding 12 which is connected between the positive and negative terminals (+) and (—) of the battery 6, through a variable resistor 13. The generator 1 is illustrated as being also provided with a differential auxiliary exciting winding 14 which is excited by a special means which will subsequently be described. The generator 1 is illustrated as being further provided with a cumulative compounding exciting winding 15 which is excited by the armature-current of the motor 4, in a circuit which can be traced from the positive-battery terminal (+), through said winding 15, and through the motor-commutator 16, to the negative battery-terminal (—).

In the illustrated form of embodiment of our invention, we utilize three different rectifying means 17, 18 and 19, each of which is illustrated as a rectifier-bridge which may be composed of copper-oxide rectifiers, or any other rectifying means. We also utilize a variable reactor 21 having serially connected alternating-current windings 22 and 23, and having a direct-current saturation-controlling means which is illustrated as comprising a direct-current winding 24, although we are not limited to the use of a single direct-current winding.

The first rectifier 17 is provided with a direct-current output-circuit 25 which is utilized as an auxiliary substantially unidirectional-current circuit for energizing the cumulative auxiliary exciting winding 9 of the motor, through an adjustable resistor 26. The same direct-current output-circuit 25 of the first rectifier 17 is also utilized to energize the differential auxiliary exciting winding 14 of the generator, through a variable resistor 27. The first rectifier 17 is also provided with an alternating-current input-circuit 28 which is energized from one of the phase-voltages of the output-circuit 2 of the generator, through the alternating-current windings 22 and 23 of the variable reactor 21.

The second rectifier 18 is energized, through a variable step-down transformer 31, from one of the phase-voltages of the generator output-circuit 2. This second rectifier 18 is provided with positive and negative direct-current terminals 33 and 34, respectively, which are utilized, in opposition to the battery-voltage (+) and (—), to energize the direct-current saturation-controlling winding 24 of the saturable reactor 21, in a circuit which can be traced from the positive battery-terminal (+), through the reactor-winding 24, to the positive rectifier-terminal 33, and thence through the rectifier to its negative terminal 34, and finally through a variable resistor 35 to the negative battery-terminal (—).

The direct-current output-voltage of the second rectifier 18 is preferably adjusted to a value equal to the minimum battery-voltage, in this case, say, 26 volts, to that when the storage battery 6 is at its minimum state of charge, no current will be drawn through the controlling winding 24 of the variable reactor 21, so that the alternating-current windings of the reactor will have a high reactive impedance, resulting in the application of only a small voltage to the first rectifier 17. As the battery-voltage 6 increases, however, above its minimum value, the battery voltage across the positive and negative terminals (+) and (—) becomes higher and higher, with respect to the rectifier-voltage appearing across the rectifier-terminals 33 and 34, so that the battery-voltage overcomes the rectifier-voltage and energizes the saturating-winding 24 of the reactor, with an energization which increases more and more, up to the maximum battery-voltage of, say, 45 volts. As the variable reactor 21 becomes more and more saturated, its alternating-current impedance reduces, thereby increasing the effective voltage which is applied to the first rectifier 17.

Since the second rectifier 18 is incapable of conducting any material amount of current in the negative direction, when its direct-current voltage is exceeded by the battery-voltage, the direct-current terminals 33 and 34 of the second rectifier are shunted by means of a resistor 37, to permit the flow of the saturating current for controlling the variable reactor 21.

The third rectifier 19 is energized from a current-transformer 38 in one of the conductors of the generator output-circuit 2, and the direct-current output-circuit 40 of this third rectifier 19 is utilized to energize the differential compounding exciting winding 10 of the motor 4.

When the performance-requirements are most exacting, we prefer to utilize a means for automatically compensating for the increased field-winding resistance which is obtained after a certain period of use, when the field-winding 7 of the motor 4 reaches or approaches its steady-state hot-temperature condition. This increase in resistance results from the fact that the field-winding 7 is composed of copper conductors, which have a material temperature-coefficient of resistance. To automatically compensate for this temperature-variation, without requiring objectionable voltage- or current-responsive relays or regulators, we utilize a thermostat 42 which is disposed in heat-exchanging relation to the exciting winding 7, as by being mounted directly on, or very close to, the frame 43 or the coils 7 of the motor 4. The thermostat is illustrated as comprising a dished bimetallic disc 44 which, when heated to a predetermined critical temperature, snaps over, and makes contact with a pair of fixed contacts 45 which are utilized to bypass an adjustable portion of the variable resistor 8 which is included in the main field-winding circuit of the motor. The thermostat 42 is thus utilized to cut out an amount of resistance which is needed to compensate for the increased hot-temperature resistance of the motor field-windings 7.

In operation, it is necessary for the motor-speed to remain constant, in order that the generator-frequency may be constant. It will be noted that the motor 4 is a self-excited shunt-wound motor, so that, as the applied battery-voltage varies, the voltage applied both to the armature-circuit 5—16 and the shunt field-winding circuit 7—8 will vary simultaneously by the same amounts, which is the condition necessary for maintaining substantially a constant speed of the motor, except for the saturation of the motor field-frame 43, which saturation begins to make itself felt as the battery-voltage varies from its minimum of 26 volts to its maximum of 45 volts. As a result of this field-frame saturation, the flux resulting from the main shunt field-winding 7 does not increase as rapidly as the applied voltage, when the battery-voltage increases, thus tending to make the motor run faster. To compensate for this discrepancy, we have provided our cumulative auxiliary exciting winding 9, and we have energized this winding with a direct-current voltage which is controlled by the variable reactor 21. The saturation of the variable reactor 21, as the battery-voltage increases above its minimum value of 26 volts, causes an increase in the rectifier-voltage 25 which is applied to the cumulative auxiliary exciting winding 9, in a manner which has already been described in connection with the second rectifier 18. Thus, the voltage of the second rectifier 18 bucks the battery-voltage (+) and (—), so that any increase in the battery-voltage above its minimum value of 26 volts serves to regulate the saturable reactor 21.

There is also a tendency for the motor-speed to drop as the load on the motor increases from a minimum value to the full-load value, this reduction in speed being due to the effect of the internal motor-resistance when traversed by the increased load-currents of the armature-circuit 5—16. To compensate for this effect, we have provided the differential compounding winding 10. This compounding winding 10 is preferably energized responsibly to the alternating-current output of the generator 1, through the third rectifier 19, the generator-current being preferred because its value is dependent solely upon the load, whereas the value of the motor-armature current varies with the applied direct-current voltage of the direct-current source 6, as well as with the actual load on the motor. However, we are not limited as to this exact detail.

The heating-compensating effects of the thermostat 42 have already been described.

By the foregoing expedients, we have succeeded in maintaining a substantially constant value of motor-speed, and hence a substantially constant value of the generator-frequency.

To maintain a constant generator-voltage, we require a constant generator-excitation, which is slightly modified in proportion to the load so as to compensate for the demagnetizing effect of armature-reaction in the generator. The main field-winding 12 of the generator is excited from the battery-voltage (+) and (—), which gives an excitation which varies with the voltage of the battery 6. To compensate for this variation, we utilize the differential auxiliary exciting winding 14 which is energized from the first rectifier 17, which is, in turn, controlled by the variable reactor 21 in such manner that the rectifier-output increases as the battery-voltage increases, as already described. On rising battery-voltages, we thus utilize the increased bucking of the differential winding 14 to compensate for the increase in excitation of the main exciting winding 12.

To compensate for the demagnetizing armature reaction which is responsive to the load, we equip the generator 1 with the cumulative compounding winding 15. Instead of energizing this cumulative compounding winding 15 so as to be responsive to the alternating-current output of the generator 1, we prefer to energize it so as to be responsive to the armature-current of the motor 4, because the motor-current varies, not only with the load, but also with the applied direct-current voltage, so that when the direct-current voltage is high, the motor draws less current than when the applied battery-voltage is low, other conditions being equal. This reduction is the excitation of the cumulative compounding winding 15, when the battery voltage is high, is useful in compensating for the increase in the main-field excitation when the battery-voltage is high, thus cooperating with the differential auxiliary winding 14 in this respect. In fact, if the constant-voltage requirements are not too exacting, the differential auxiliary winding 14 may be omitted altogether, although we prefer to utilize it, as described.

In any instance when a direct-current or unidirectional flux is required, which is to be responsive to a plurality of variables, the resultant flux may be obtained by the expedient of deriving a separate voltage or current which is suitably responsive to each of the controlling variables, and these separate voltages or currents can either be algebraically combined in a single circuit, including a single direct-current winding, as in the case of the saturation-controlling winding 24 of the variable reactor 21, or the several controlling voltages or currents may be applied to separate direct-current windings, as we have done in the field-circuits of both the motor 4 and the generator 1. We desire it to be understood, however, that the one expedient may be freely substituted or exchanged for the other, and that various other modifications and alterations may be made by those skilled in the art, without departing from the essential spirit of our invention. We desire, therefore, that the appended claims shall be accorded the broadest construction consistent with their language.

We claim as our invention:

1. A motor-generator set comprising: a direct-current motor; an alternating-current generator driven by said motor; a variable-voltage direct-current source for supplying energy to said motor; a rectifying means; a saturable reactor having an alternating-current circuit and a direct-current controlling means; an auxiliary substantially unidirectional-current circuit; means for energizing said auxiliary circuit from an alternating-current voltage of said generator through said rectifying means and through said saturable reactor, the alternating-current circuit of said reactor being connected between the generator-voltage and the rectifying means; means for energizing the direct-current controlling-means of the reactor responsively to a predetermined function of the voltage of the direct-current source; and means for causing said motor to be magnetically excited responsively to a predetermined function of the voltage of the direct-current source, and also cumulatively responsively to a predetermined function of the voltage of said auxiliary circuit.

2. A motor-generator set comprising: a direct-current motor; an alternating-current generator driven by said motor; a variable-voltage direct-current source for supplying energy to said motor; a rectifying means; a saturable reactor having an alternating-current circuit and a direct-current controlling means; an auxiliary substantially unidirectional-current circuit; means for energizing said auxiliary circuit from an alternating-current voltage of said generator through said rectifying means and through said saturable reactor, the alternating-current circuit of said reactor being connected between the generator-voltage and the rectifying means; means for energizing the direct-current controlling means of the reactor responsively to a predetermined function of a predetermined electrical quantity of the motor-generator set; and means for causing said motor to be magnetically excited responsively to a predetermined function of the voltage of the direct-current source, and also responsively to a predetermined function of the voltage of said auxiliary circuit.

3. A motor-generator set comprising: a direct-current motor; an alternating-current generator driven by said motor; a variable-voltage direct-current source for supplying energy to said motor; a first rectifying means; a second rectifying means; each rectifying means having an alternating-current input-circuit and a rectified-current output-circuit; a saturable reactor having an alternating-current circuit and a direct-current controlling means; means for energizing the input-circuit of the first rectifying means from an alternating-current voltage of said generator through said saturable reactor, the alternating-current circuit of said reactor being connected between the generator-voltage and said first rectifying means; means for energizing the input-circuit of the second rectifying means responsively to a predetermined function of an alternating-current voltage of said generator; means for energizing the direct-current controlling means of the reactor responsively to a predetermined function of the voltage of the direct-current source, and also differentially responsively to the voltage of the output-circuit of the second rectifying means; and means for causing said motor to be magnetically excited responsively to a predetermined function of the voltage of the direct-current source, and also cumulatively responsively to a predetermined function of the voltage of the output-circuit of the first rectifying means.

4. A motor-generator set comprising: a direct-current motor; an alternating-current generator driven by said motor; a variable-voltage direct-current source for supplying energy to said motor; a variable-load circuit for said generator; shunt-winding exciting-means for said motor; and direct-current means for causing said motor to be magnetically excited differentially responsively to a predetermined function of an alternating-current load-current of the generator, said last-mentioned means including means for responding to the alternating-current load of the generator and for converting that alternating-current response into a rectified unidirectional current, and means for utilizing said rectified unidirectional current in producing a differential field-excitation effect on the generator.

5. A motor-generator set comprising: a direct-current motor including an armature-circuit; an alternating-current generator including a variable-load output-circuit; mechanical driving-means for driving said generator from said motor; a variable-voltage source of electrical energy; means for energizing the motor armature-circuit from said source; direct-current means for causing the motor to be variably magnetically excited in such manner as to cause the speed of the motor to be substantially constant throughout predetermined ranges of source-voltages and generator-loads; a rectifying means having an alternating-current input-circuit and a rectified-current output-circuit; a saturable reactor having an alternating-current circuit and a direct-current controlling means; means for energizing the input circuit of the rectifying means from an alternating-current voltage of said generator through said saturable reactor, the alternating-current circuit of said reactor being connected between the generator-voltage and the rectifying means; means for energizing the direct-current controlling-means of the reactor responsively to a predetermined function of the voltage of the direct-current source; and direct-current means for causing said generator to be magnetically excited responsively to a predetermined function of the voltage of the source, and also differentially responsively to the voltage of the output-circuit of the rectifying means.

6. A motor-generator set comprising: a direct-current motor including an armature-circuit; an alternating-current generator including a variable-load output-circuit; mechanical driving-means for driving said generator from said motor; a variable-voltage source of electrical energy; means for energizing the motor armature-circuit from said source; direct-current means for causing the motor to be variably magnetically excited in such manner as to cause the speed of the motor to be substantially constant throughout predetermined ranges of source-voltages and generator-loads; a rectifying means having an alternating-current input-circuit and a rectified-current output-circuit; a saturable reactor having an alternating-current circuit and a direct-current controlling means; means for energizing the input circuit of the rectifying means from an alternating-current voltage of said generator through said saturable reactor, the alternating-current circuit of said reactor being connected between the generator-voltage and the rectifying means; means for energizing the direct-current controlling-means of the reactor responsively to a predetermined function of a predetermined electrical quantity of the motor-generator set; and direct-current means for causing said generator to be magnetically excited responsively to a predetermined function of the voltage of the source, and also responsively to the voltage of the output-circuit of the rectifying means.

7. A motor-generator set comprising: a direct-current motor including an armature-circuit; an alternating-current generator including a variable-load output-circuit; mechanical driving-means for driving said generator from said motor; a variable-voltage source of electrical energy; means for energizing the motor armature-circuit from said source; direct-current means for causing the motor to be variably magnetically excited in such manner as to cause the speed of the motor to be substantially constant throughout predetermined ranges of source-voltages and generator-loads; a first rectifying means; a second rectifying means; each rectifying means having an alternating-current input-circuit and a rectified-current output-circuit; a saturable reactor having an alternating-current circuit and a direct-current controlling means; means for energizing the input-circuit of the first rectifying means from an alternating-current voltage of said generator through said saturable reactor, the alternating-current circuit of said reactor being connected between the generator-voltage and said first rectifying means; means for energizing the input-circuit of the second rectifying means responsively to a predetermined function of an alternating-current voltage of said generator; means for energizing the direct-current controlling-means of the reactor responsively to a predetermined function of the voltage of the direct-current source, and also differentially responsively to the voltage of the output-circuit of the second rectifying means; and direct-current means for causing said generator to be magnetically excited responsively to a predetermined function of the voltage of the source, and also differentially responsively to the voltage of the output-circuit of the first rectifying means.

8. A motor-generator set comprising: a direct-current motor including an armature-circuit; an alternating-current generator including a variable-load output-circuit; mechanical driving-means for driving said generator from said motor; a variable-voltage source of electrical energy; means for energizing the motor armature-circuit from said source; direct-current means for causing the motor to be variably magnetically excited in such manner as to cause the speed of the motor to be substantially constant throughout predetermined ranges of source-voltages and generator-loads; a first rectifying means; a second rectifying means; each rectifying means having an alternating-current input-circuit and a rectified-current output-circuit; a saturable reactor having an alternating-current circuit and a direct-current controlling means; means for energizing the input-circuit of the first rectifying means from an alternating-current voltage of said generator through said saturable reactor, the alternating-current circuit of said reactor being connected between the generator-voltage and said first rectifying means; means for energizing the input-circuit of the second rectifying means responsively to a predetermined function of an alternating-current voltage of said generator; means for energizing the direct-current controlling-means of the reactor responsively to a predetermined function of the voltage of the direct-current source, and also differentially responsively to the voltage of the output-circuit of the second rectifying means; and direct-current means for causing said generator to be magnetically excited responsively to a predetermined function of the voltage of the source, and also cumulatively responsively to a predetermined function of a load-current of the motor-generator set, and also differentially responsive to the voltage of the output-circuit of the first rectifying means.

9. A variable-load dynamo-electric machine and direct-current means for causing the machine to be variably magnetically excited in such a manner as to tend to maintain a predetermined characteristic, said direct-current means including a winding of a conductor-material having a temperature-coefficient large enough to cause a discrepancy in the maintained characteristic, and contact-making thermostat-means in heat-exchanging relation to said winding for effecting a temperature-correcting adjustment of said direct-current means in response to the attainment of a predetermined elevated temperature, the amount of said temperature-correcting adjustment being approximately suitable for correcting the effect of the temperature-induced resistance-change in the winding in connection with the maintenance of said characteristic.

10. A motor-generator set comprising: a direct-current motor including an armature-circuit; an alternating-current generator including a variable-load output-circuit; mechanical driving-means for driving said generator from said motor; a variable-voltage source of electrical energy; means for energizing the motor armature-circuit from said source; direct-current means for causing the motor to be variably magnetically excited in such manner as to tend to cause the speed of the motor to be substantially constant throughout predetermined ranges of source-voltages and generator-loads; direct-current means for causing the generator to be variably magnetically excited in such manner as to tend to cause the output-voltage of the generator to be substantially constant throughout predetermined ranges of source-voltages and generator-loads; at least one of said direct-current means including a winding of a conductor-material having a temperature-coefficient large enough to cause a discrepancy in the maintained characteristic, and contact-making thermostat-means in heat-exchanging relation to said winding for effecting a temperature-correcting adjustment of said one of said direct-current means in response to the attainment of a predetermined elevated temperature, the amount of said temperature-correcting adjustment being approximately suitable for correcting the effect of the temperature-induced resistance-change in the winding in connection with the maintenance of said characteristic.

11. A motor-generator set comprising: a direct-current motor including an armature-circuit; an alternating-current generator including a variable-load output-circuit; mechanical driving-means for driving said generator from said motor; a variable-voltage source of electrical energy; means for energizing the motor armature-circuit from said source; direct-current exciting-means for the motor; direct-current exciting-means for the generator; a saturable reactor having an alternating-current circuit and a direct-current controlling means; direct-current control-circuit means for variably energizing the direct-current controlling-means of the reactor; means for obtaining an alternating-current electrical quantity from the generator output-circuit and for utilizing the alternating-current circuit of the reactor to modify said alternating-current electrical quantity; and rectifying means for utilizing said modified alternating-current electrical quantity in the control of at least one of said direct-current exciting-means.

12. A motor-generator set comprising: a direct-current motor including an armature-circuit; an alternating-current generator including a variable-load output-circuit; mechanical driving-means for driving said generator from said motor; a variable-voltage source of electrical energy; means for energizing the motor armature-circuit from said source; direct-current exciting-means for the motor; direct-current exciting-means for the generator; a saturable reactor having an alternating-current circuit and a direct-current controlling means; means for energizing the direct-current controlling means of the reactor responsively to a predetermined function of the voltage of the direct-current source; means for obtaining an alternating-current electrical quantity from the generator output-circuit and for utilizing the alternating-current circuit of the reactor to modify said alternating-current electrical quantity; and rectifying means for utilizing said modified alternating-current electrical quantity in the control of at least one of said direct-current exciting-means.

13. A motor-generator set comprising: a direct-current motor including an armature-circuit; an alternating-current generator including a variable-load output-circuit; mechanical driving-means for driving said generator from said motor; a variable-voltage source of electrical energy; means for energizing the motor armature-circuit from said source; direct-current exciting-means for the motor; direct-current exciting-means for the generator; a saturable reactor having an alternating-current circuit and a direct-current controlling means; means for energizing the direct-current controlling-means of the reactor responsively to a predetermined function of a first alternating-current quantity of the output-circuit of the generator; means for obtaining a second alternating-current electrical quantity from the generator output-circuit and for utilizing the alternating-current circuit of the reactor to modify said second alternating-current electrical quantity; and rectifying means for utilizing said modified alternating-current electrical quantity in the control of at least one of said direct-current exciting-means.

14. A motor-generator set comprising: a direct-current motor including an armature-circuit; an alternating-current generator including a variable-load output-circuit; mechanical driving-means for driving said generator from said motor; a variable-voltage source of electrical energy; means for energizing the motor armature-circuit from said source; a first rectifying means; a second rectifying means; each rectifying means having an alternating-current input-circuit and a rectified-current output-circuit; a saturable reactor having an alternating-current circuit and a direct-current controlling means; means for energizing the input-circuit of the first rectifying means from an alternating-current voltage of said generator through said saturable reactor, the alternating-current circuit of said reactor being connected between the generator-voltage and said first rectifying means; means for energizing the input-circuit of the second rectifying means responsively to a predetermined function of an alternating-current voltage of said generator; means for energizing the direct-current controlling-means of the reactor responsively to a predetermined function of the voltage of the direct-current source, and also differentially responsively to the voltage of the output-circuit of the second rectifying means; direct-current means for causing said motor to be magnetically excited responsively to a predetermined function of the voltage of the direct-current source, and also cumulatively responsively to a predetermined function of the voltage of the output-circuit of the first rectifying means, and also differentially responsively to a predetermined function of a load-current of the motor-generator set; direct-current means for causing said generator to be magnetically excited responsively to a predetermined function of the voltage of the source, and also cumulatively responsively to a predetermined function of a load-current of the motor-generator set, and also differentially responsively to the voltage of the output-circuit of the first rectifying means; both of said direct-current means including exciting windings; and thermostat-means in heat-exchanging relation to the exciting windings of the motor for effecting a temperature-responsive regulating-action thereon.

HERBERT W. GRAYBROOK.
CHESTER J. BISCUP.